United States Patent
Sugawara et al.

(10) Patent No.: US 11,811,065 B2
(45) Date of Patent: Nov. 7, 2023

(54) METHOD OF PRODUCING SLURRY COMPOSITION FOR SECONDARY BATTERY POSITIVE ELECTRODE, METHOD OF PRODUCING POSITIVE ELECTRODE FOR SECONDARY BATTERY, AND METHOD OF PRODUCING SECONDARY BATTERY

(71) Applicant: ZEON CORPORATION, Tokyo (JP)

(72) Inventors: Shinsuke Sugawara, Tokyo (JP); Naoki Takahashi, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 0 days.

(21) Appl. No.: 17/595,943

(22) PCT Filed: May 19, 2020

(86) PCT No.: PCT/JP2020/019819
§ 371 (c)(1),
(2) Date: Nov. 30, 2021

(87) PCT Pub. No.: WO2020/241384
PCT Pub. Date: Dec. 3, 2020

(65) Prior Publication Data
US 2022/0231297 A1   Jul. 21, 2022

(30) Foreign Application Priority Data
May 31, 2019   (JP) .................. 2019-102596

(51) Int. Cl.
*H01M 4/04*   (2006.01)
*H01M 4/62*   (2006.01)
*C01G 53/00*   (2006.01)
*H01M 4/505*   (2010.01)
*H01M 4/525*   (2010.01)
*H01M 4/02*   (2006.01)

(52) U.S. Cl.
CPC ............ *H01M 4/622* (2013.01); *C01G 53/50* (2013.01); *H01M 4/0404* (2013.01); *H01M 4/505* (2013.01); *H01M 4/525* (2013.01); *H01M 2004/028* (2013.01)

(58) Field of Classification Search
CPC .................................................. H01M 4/0404
See application file for complete search history.

(56) References Cited

U.S. PATENT DOCUMENTS

| | | | |
|---|---|---|---|
| 2010/0209757 A1 | 8/2010 | Tomoyo et al. | |
| 2013/0224585 A1* | 8/2013 | Oh ..................... | C01G 53/50 429/211 |
| 2014/0178756 A1* | 6/2014 | Ishii ..................... | H01M 4/62 429/211 |
| 2015/0050554 A1 | 2/2015 | Fukumine et al. | |
| 2015/0050555 A1* | 2/2015 | Fukumine ............ | H01M 10/052 429/217 |

FOREIGN PATENT DOCUMENTS

| | | |
|---|---|---|
| EP | 3584862 A1 | 12/2019 |
| JP | 2010192200 A | 9/2010 |
| JP | 2013051203 A | 3/2013 |
| JP | 2016058185 A | 4/2016 |
| JP | 6044773 B2 | 12/2016 |
| JP | 2018200889 A | 12/2018 |
| WO | 2013080989 A1 | 6/2013 |
| WO | 2019065254 A1 | 4/2019 |

OTHER PUBLICATIONS

Nov. 16, 2021, International Preliminary Report on Patentability issued in the International Patent Application No. PCT/JP2020/019819.
Aug. 18, 2020, International Search Report issued in the International Patent Application No. PCT/JP2020/019819.
Jun. 29, 2023, the Extended European Search Report issued by the European Patent Office in the corresponding European Patent Application No. 20814266.1.

* cited by examiner

*Primary Examiner* — Austin Murata
(74) *Attorney, Agent, or Firm* — KENJA IP LAW PC

(57) ABSTRACT

Provided is a method of producing a slurry composition for a secondary battery positive electrode containing an organic solvent, a specific polymer, and a positive electrode active material satisfying a specific chemical composition. The specific polymer includes a nitrile group-containing monomer unit and a linear alkylene structural unit having a carbon number of 4 or more. The pH of an extract of the specific polymer that is obtained by a specific method is not lower than 3.5 and lower than 6.0. The positive electrode active material is an active material having a high nickel content ratio.

6 Claims, No Drawings

METHOD OF PRODUCING SLURRY COMPOSITION FOR SECONDARY BATTERY POSITIVE ELECTRODE, METHOD OF PRODUCING POSITIVE ELECTRODE FOR SECONDARY BATTERY, AND METHOD OF PRODUCING SECONDARY BATTERY

TECHNICAL FIELD

The present disclosure relates to a method of producing a slurry composition for a secondary battery positive electrode, a method of producing a positive electrode for a secondary battery, and a method of producing a secondary battery.

BACKGROUND

Non-aqueous secondary batteries (hereinafter, also referred to simply as "secondary batteries") such as lithium ion secondary batteries have characteristics such as compact size, light weight, high energy density, and the ability to be repeatedly charged and discharged, and are used in a wide variety of applications. A secondary battery generally includes battery members such as electrodes (positive electrode and negative electrode) and a separator that isolates the positive electrode and the negative electrode from each other.

A positive electrode used for a secondary battery such as a lithium ion secondary battery generally includes a current collector and an electrode mixed material layer (positive electrode mixed material layer) formed on the current collector. The positive electrode mixed material layer is formed, for example, using a slurry composition in which a positive electrode active material, a binder composition containing a binder, and so forth are dispersed in a dispersion medium.

In order to further improve secondary battery performance, attempts have been made in recent years to improve slurry compositions used in positive electrode mixed material layer formation.

In one specific example, Patent Literature (PTL) 1 discloses a slurry composition for a secondary battery positive electrode containing a positive electrode active material and a binder that includes a polymerization unit including a nitrile group, an aromatic vinyl polymerization unit, a polymerization unit including a hydrophilic group, and a linear alkylene polymerization unit having a carbon number of 4 or more. In PTL 1, various lithium-containing complex metal oxides are given as examples of the positive electrode active material contained in this slurry composition for a secondary battery positive electrode. Moreover, PTL 1 actually verifies various attributes for when lithium cobalt oxide (LiCoO$_2$) as a positive electrode active material is combined with the specific binder.

CITATION LIST

Patent Literature

PTL 1: JP6044773B2

SUMMARY

Technical Problem

From a viewpoint of realizing high quality positive electrode production, it is desirable that a slurry composition for a secondary battery positive electrode experiences little viscosity change over time (i.e., has high viscosity stability). In addition, a slurry composition for a secondary battery positive electrode is required to have a low tendency for sedimentation of solid content to occur even once time has passed to a certain extent after production (i.e., have excellent sedimentation resistance).

However, there is room for improvement of the conventional slurry composition for a secondary battery positive electrode described above in terms of increasing both viscosity stability and sedimentation resistance.

Accordingly, one object of the present disclosure is to provide a method of producing a slurry composition for a secondary battery positive electrode having excellent viscosity stability and sedimentation resistance.

Another object of the present disclosure is to provide a method of producing a positive electrode for a secondary battery that can form a secondary battery having excellent battery characteristics.

Yet another object of the present disclosure is to provide a method of producing a secondary battery that has excellent battery characteristics.

Solution to Problem

The inventors made extensive studies to solve the problems set forth above. The inventors reached a new finding that by, in production of a slurry composition for a secondary battery positive electrode, compounding a positive electrode active material that satisfies a specific chemical composition and a polymer that includes a nitrile group-containing monomer unit and a linear alkylene structural unit having a carbon number of 4 or more and for which the pH of an extract extracted by a specific method is not lower than 3.5 and lower than 6.0, it is possible to increase viscosity stability and sedimentation resistance of the obtained slurry composition. In this manner, the inventors completed the present disclosure.

Specifically, the present disclosure aims to advantageously solve the problems set forth above, and a presently disclosed method of producing a slurry composition for a secondary battery positive electrode is a method of producing a slurry composition for a secondary battery positive electrode containing an organic solvent, a positive electrode active material, and a polymer including a nitrile group-containing monomer unit and a linear alkylene structural unit having a carbon number of 4 or more, wherein an extract obtained in a situation in which the polymer, as an 8 mass % N-methyl-2-pyrrolidone solution, is diluted by a factor of 10 with deionized water has a pH of not lower than 3.5 and lower than 6.0, and the positive electrode active material has a chemical composition represented by formula (I), shown below.

$$Li_\alpha Ni_a Co_b Mn_c M_d O_{2-(\beta/2)} X_\beta \quad (1)$$

In formula (I):

M is an element selected from the group consisting of Mg, Al, Cr, V, Ti, Cr, Fe, Zr, Zn, Si, Y, Nb, Ga, Sn, Mo, W, and combinations thereof;

X is a halogen element; and

α, β, a, b, c, and d satisfy conditions (1) to (8), shown below.

$$0.90 \leq \alpha \leq 1.5 \quad (1)$$

$$0 \leq \beta \leq 0.1 \quad (2)$$

$$0.55 \leq a \leq 0.9 \quad (3)$$

$$0 \leq b \leq 0.45 \quad (4)$$

$$0 \leq c \leq 0.45 \quad (5)$$

$$0 \leq d \leq 0.1 \quad (6)$$

$$0.1 \leq b+c+d \leq 0.45 \quad (7)$$

$$a+b+c+d=1 \quad (8)$$

By compounding a polymer that includes specific units and for which the pH of an extract obtained by a specific method is not lower than 3.5 and lower than 6.0 and also compounding a positive electrode active material that satisfies a specific chemical composition and has a high nickel content ratio in this manner, it is possible to obtain a slurry composition for a secondary battery positive electrode having excellent viscosity stability and sedimentation resistance. Note that the phrase "includes a monomer unit" as used with respect to a polymer means that "a polymer obtained with the monomer includes a structural unit derived from the monomer". Moreover, the phrase "includes a linear alkylene structural unit" means that a polymer includes a repeating unit composed of only a linear alkylene structure represented by a general formula: —$C_nH_{2n}$— (n is an integer of 4 or more). Furthermore, the presence or absence of a monomer unit or structural unit in a polymer can be determined and the proportional content of the monomer unit or structural unit in the polymer can be measured by $^1$H-NMR, for example. Also, the pH of an extract of a polymer can be measured by a method described in the EXAMPLES section. Moreover, the chemical composition of a positive electrode active material can be analyzed using an ICP (Inductively Coupled Plasma) optical emission spectrometer.

In the presently disclosed method of producing a slurry composition for a secondary battery positive electrode, the polymer preferably has an iodine value of not less than 3 g/100 g and not more than 60 g/100 g. When the iodine value of the polymer is within the range set forth above, the resistance of an obtained secondary battery can be reduced.

Note that the iodine value of a polymer referred to in the present disclosure can be measured in accordance with HS K6235(2006).

In the presently disclosed method of producing a slurry composition for a secondary battery positive electrode, the polymer preferably further includes an aromatic vinyl monomer unit. When the polymer includes an aromatic vinyl monomer unit, a slurry composition for a secondary battery positive electrode having even better viscosity stability can be obtained.

In the presently disclosed method of producing a slurry composition for a secondary battery positive electrode, the polymer preferably further includes a hydrophilic group-containing monomer unit. When the polymer includes a hydrophilic group-containing monomer unit, a slurry composition for a secondary battery positive electrode having even better sedimentation resistance can be obtained.

Moreover, the present disclosure aims to advantageously solve the problems set forth above, and a presently disclosed method of producing a positive electrode for a secondary battery comprises: a slurry composition production step of producing a slurry composition for a secondary battery positive electrode by the method of producing a slurry composition for a secondary battery positive electrode set forth above; and a step of applying the slurry composition obtained in the slurry composition production step onto at least one side of a current collector and drying the slurry composition to form a positive electrode mixed material layer. A production method that includes these steps makes it possible to efficiently produce a positive electrode for a secondary battery that can cause a secondary battery to display excellent battery characteristics.

Furthermore, the present disclosure aims to advantageously solve the problems set forth above, and a presently disclosed method of producing a secondary battery is a method of producing a secondary battery including a positive electrode, a negative electrode, a separator, and an electrolyte solution, comprising a step of producing the positive electrode by the method set forth above. This method of producing a secondary battery makes it possible to efficiently produce a secondary battery having excellent battery characteristics.

Advantageous Effect

According to the present disclosure, it is possible to provide a method of producing a slurry composition for a secondary battery positive electrode having excellent viscosity stability and sedimentation resistance.

Moreover, according to the present disclosure, it is possible to provide a method of producing a positive electrode for a secondary battery that can form a secondary battery having excellent battery characteristics.

Furthermore, according to the present disclosure, it is possible to provide a method of producing a secondary battery that has excellent battery characteristics.

DETAILED DESCRIPTION

The following provides a detailed description of embodiments of the present disclosure.

The presently disclosed method of producing a slurry composition for a secondary battery positive electrode is used in production of a slurry composition that is used in production of a secondary battery. Moreover, the presently disclosed method of producing a slurry composition for a secondary battery positive electrode can be implemented in the presently disclosed method of producing a positive electrode for a secondary battery. Furthermore, the presently disclosed method of producing a positive electrode for a secondary battery can be implemented in the presently disclosed method of producing a secondary battery.

Method of Producing Slurry Composition for Secondary Battery Positive Electrode

The presently disclosed method of producing a slurry composition for a secondary battery positive electrode is a method of producing a slurry composition for a secondary battery positive electrode containing: an organic solvent; a high-nickel positive electrode active material that satisfies a specific chemical composition described further below and has a high nickel content ratio; and a polymer that includes a nitrile group-containing monomer unit and a linear alkylene structural unit having a carbon number of 4 or more and for which the pH of an extract obtained by a specific method is not lower than 3.5 and lower than 6.0. The extract of the polymer is obtained by diluting the polymer, as an 8 mass % N-methyl-2-pyrrolidone solution, by a factor of 10 with deionized water.

The presently disclosed method of producing a slurry composition makes it possible to obtain a slurry composition for a secondary battery positive electrode having excellent viscosity stability and sedimentation resistance. Note that a conductive material and other components may optionally be used in production of a slurry composition in the presently disclosed method of producing a slurry composition for a secondary battery positive electrode.

Polymer

The specific polymer is a component that can mainly function to increase sedimentation resistance and viscosity stability of the slurry composition. The polymer displays solubility in an organic solvent such as N-methyl-2-pyrrolidone that can be contained in the slurry composition. Through at least some of the polymer being present in a dissolved state in the slurry composition, it is possible to inhibit aggregation or sedimentation of solid content in the slurry composition. In addition, the polymer may also function as a binder. When the polymer is said to "function as a binder", this means that in a positive electrode mixed material layer formed using the slurry composition, the polymer functions to hold components such as a positive electrode active material and a conductive material so that these components do not detach from the positive electrode mixed material layer.

The polymer is required to include a nitrile group-containing monomer unit and a linear alkylene structural unit having a carbon number of 4 or more as previously described. In addition, the polymer preferably includes either or both of an aromatic vinyl monomer unit and a hydrophilic group-containing monomer unit, and more preferably includes both an aromatic vinyl monomer unit and a hydrophilic group-containing monomer unit. The polymer may optionally include other monomer units so long as the effects disclosed herein are not lost. The polymer is preferably a hydrogenated polymer obtained by using a known method to hydrogenate a polymer that is obtained by polymerizing a monomer composition containing at least a nitrile group-containing monomer and a conjugated diene monomer.

Nitrile Group-Containing Monomer Unit

The nitrile group-containing monomer unit is a repeating unit that is derived from a nitrile group-containing monomer. The polymer has high solubility in an organic solvent such as N-methyl-2-pyrrolidone and can increase the viscosity of the obtained slurry composition well as a result of including the nitrile group-containing monomer unit.

Examples of nitrile group-containing monomers that can form the nitrile group-containing monomer unit include α,β-ethylenically unsaturated nitrile monomers. Specifically, any α,β-ethylenically unsaturated compound that has a nitrile group can be used as an α,β-ethylenically unsaturated nitrile monomer without any specific limitations. Examples include acrylonitrile; α-halogenoacrylonitriles such as α-chloroacrylonitrile and α-bromoacrylonitrile; and α-alkylacrylonitriles such as methacrylonitrile and α-ethylacrylonitrile. Of these examples, acrylonitrile and methacrylonitrile are preferable, and acrylonitrile is more preferable as a nitrile group-containing monomer.

One of these nitrile group-containing monomers may be used individually, or two or more of these nitrile group-containing monomers may be used in combination.

The proportional content of the nitrile group-containing monomer unit in the polymer when all repeating units in the polymer are taken to be 100 mass % is preferably 10 mass % or more, more preferably 15 mass % or more, and even more preferably 20 mass % or more, and is preferably 45 mass % or less, more preferably 40 mass % or less, and even more preferably 35 mass % or less. When the proportional content of the nitrile group-containing monomer unit in the polymer is not less than any of the lower limits set forth above, solubility of the polymer in an organic solvent such as N-methyl-2-pyrrolidone suitably increases, and the viscosity of the slurry composition can be suitably increased. Moreover, when the proportional content of the nitrile group-containing monomer unit in the polymer is not more than any of the upper limits set forth above, sedimentation resistance of the obtained slurry composition can be further increased.

Linear Alkylene Structural Unit Having Carbon Number of 4 or More

The linear alkylene structural unit having a carbon number of 4 or more (hereinafter, also referred to simply as the "alkylene structural unit") is a repeating unit that is composed of only a linear alkylene structure represented by a general formula: —$C_nH_{2n}$— (n is an integer of 4 or more). The polymer can increase sedimentation resistance of the obtained slurry composition as a result of including the linear alkylene structural unit having a carbon number of 4 or more.

The method by which the linear alkylene structural unit is introduced into the polymer is not specifically limited and may, for example, be either of the following methods (1) or (2).
  (1) A method in which a polymer is produced from a monomer composition containing a conjugated diene monomer and then the polymer is hydrogenated to convert a conjugated diene monomer unit to a linear alkylene structural unit
  (2) A method in which a polymer is produced from a monomer composition containing a 1-olefin monomer such as 1-butene or 1-hexene The conjugated diene monomer or 1-olefin monomer may be one monomer used individually or two or more monomers used in combination.

Of these methods, method (1) is preferable in terms of ease of production of the polymer.

Examples of conjugated diene monomers that can be used in method (1) include conjugated diene compounds such as 1,3-butadiene, isoprene, 2,3-dimethyl-1,3-butadiene, and 1,3-pentadiene. Of these conjugated diene compounds, 1,3-butadiene is preferable. In other words, the linear alkylene structural unit is preferably a structural unit obtained through hydrogenation of a conjugated diene monomer unit (i.e., is preferably a hydrogenated conjugated diene unit), and is more preferably a structural unit obtained through hydrogenation of a 1,3-butadiene unit (i.e., is more preferably a hydrogenated 1,3-butadiene unit). The hydrogenation can be performed by a commonly known method such as described further below.

The proportional content of the linear alkylene structural unit having a carbon number of 4 or more in the polymer when all repeating units (total of structural units and monomer units) in the polymer are taken to be 100 mass % is preferably 15 mass % or more, more preferably 20 mass % or more, and even more preferably 25 mass % or more, and is preferably 65 mass % or less, more preferably 55 mass % or less, and even more preferably 45 mass % or less. When the proportional content of the linear alkylene structural unit is not less than any of the lower limits set forth above, sedimentation resistance of the obtained slurry composition can be further increased. Moreover, when the proportional content of the linear alkylene structural unit is not more than any of the upper limits set forth above, solubility of the polymer in an organic solvent such as N-methyl-2-pyrrolidone suitably increases, and the viscosity of the slurry composition can be suitably increased. As a result, it is possible to form a positive electrode well using the obtained slurry composition and to increase the initial efficiency of a secondary battery that includes this positive electrode.

Note that in a case in which the polymer is a hydrogenated polymer obtained through hydrogenation of a polymer that is obtained through polymerization of a monomer composition containing a conjugated diene as previously described, the hydrogenated polymer can include the linear alkylene structural unit and also other units derived from the conjugated diene (for example, a non-hydrogenated conjugated diene unit may be included). In this case, the total proportional content of the linear alkylene structural unit and other conjugated diene-derived units (hereinafter, also referred to as the "proportional content of conjugated diene-derived units") in the hydrogenated polymer is preferably within any of the preferred proportional content ranges that were previously described for the "proportional content of the linear alkylene structural unit". When the total proportion with the proportional content of conjugated diene-derived units is within any of the ranges set forth above, the effects described in relation to upper and lower limits for the proportional content of the linear alkylene structural unit can be displayed even better.

Aromatic Vinyl Monomer Unit

The aromatic vinyl monomer unit is a repeating unit that is derived from an aromatic vinyl monomer. When the polymer includes the aromatic vinyl monomer unit, viscosity stability of the obtained slurry composition can be further increased.

Examples of monomers that can form the aromatic vinyl polymerization unit include aromatic vinyl monomers such as styrene, α-methylstyrene, and vinyltoluene. Of these monomers, styrene is preferable because of favorable copolymerizability with other monomers and relatively little side reaction such as branch, chain, or intermolecular crosslinking of the polymer.

The proportional content of the aromatic vinyl monomer unit in the polymer when all repeating units in the polymer are taken to be 100 mass % is preferably 15 mass % or more, and more preferably 20 mass % or more, and is preferably 55 mass % or less, more preferably 45 mass % or less, and even more preferably 40 mass % or less. When the proportional content of the aromatic vinyl monomer unit in the polymer is not less than any of the lower limits set forth above, viscosity stability of the obtained slurry composition can be further increased. Moreover, when the proportional content of the aromatic vinyl monomer unit in the polymer is not more than any of the upper limits set forth above, sedimentation resistance of the obtained slurry composition can be further increased.

Hydrophilic Group-Containing Monomer Unit

The hydrophilic group-containing monomer unit is a monomer unit that is derived from a monomer including a hydrophilic group such as an acidic group or a hydroxy group. The acidic group may be a carboxy group, a sulfo group, a phosphate group, or the like. Note that the various monomers that can be used to form the previously described nitrile group-containing monomer unit, aromatic vinyl monomer unit, and linear alkylene structural unit do not include a hydrophilic group such as a carboxy group, a sulfo group, a phosphate group, or a hydroxy group. When the polymer includes the hydrophilic group-containing monomer unit, sedimentation resistance of the obtained slurry composition can be further increased. By using a slurry composition that has excellent sedimentation resistance, it is possible to form a homogeneous positive electrode mixed material layer having a good electrical conduction network and to reduce the resistance of an obtained secondary battery.

Examples of carboxy group-containing monomers include monocarboxylic acids, derivatives of monocarboxylic acids, dicarboxylic acids, acid anhydrides of dicarboxylic acids, and derivatives of these dicarboxylic acids and acid anhydrides.

Examples of monocarboxylic acids include acrylic acid, methacrylic acid, and crotonic acid.

Examples of derivatives of monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of dicarboxylic acids include maleic acid, fumaric acid, and itaconic acid.

Examples of derivatives of dicarboxylic acids include methylmaleic acid, dimethylmaleic acid, phenylmaleic acid, chloromaleic acid, dichloromaleic acid, fluoromaleic acid, and maleic acid esters such as methyl allyl maleate, diphenyl maleate, nonyl maleate, decyl maleate, dodecyl maleate, octadecyl maleate, and fluoroalkyl maleates.

Examples of acid anhydrides of dicarboxylic acids include maleic anhydride, acrylic anhydride, methylmaleic anhydride, and dimethylmaleic anhydride.

Furthermore, an acid anhydride that produces a carboxy group upon hydrolysis can also be used as a compound including a carboxy group.

Other examples include monoesters and diesters of α,β-ethylenically unsaturated polybasic carboxylic acids such as monoethyl maleate, diethyl maleate, monobutyl maleate, dibutyl maleate, monoethyl fumarate, diethyl fumarate, monobutyl fumarate, dibutyl fumarate, monocyclohexyl fumarate, dicyclohexyl fumarate, monoethyl itaconate, diethyl itaconate, monobutyl itaconate, and dibutyl itaconate.

Examples of sulfo group-containing monomers include vinyl sulfonic acid, methyl vinyl sulfonic acid, (meth)allyl sulfonic acid, styrene sulfonic acid, (meth)acrylic acid 2-sulfoethyl, 2-acrylamido-2-methylpropane sulfonic acid, and 3-allyloxy-2-hydroxypropane sulfonic acid.

In the present disclosure, "(meth)allyl" is used to indicate "allyl" and/or "methallyl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Examples of hydroxy group-containing monomers include ethylenically unsaturated alcohols such as (meth)allyl alcohol, 3-buten-1-ol, and 5-hexen-1-ol; alkanol esters of ethylenically unsaturated carboxylic acids such as 2-hydroxyethyl acrylate, 2-hydroxypropyl acrylate, 2-hydroxyethyl methacrylate, and 2-hydroxypropyl methacrylate; esters of (meth)acrylic acid and polyalkylene glycol represented by a general formula $CH_2=CR^1-COO-(C_nH_{2n}O)_m-H$ (where m represents an integer of 2 to 9, n represents an integer of 2 to 4, and $R^1$ represents hydrogen or a methyl group); mono(meth)acrylic acid esters of dihydroxy esters of dicarboxylic acids such as 2-hydroxyethyl-2'-(meth)acryloyloxy phthalate and 2-hydroxyethyl-2'-(meth)acryloyloxy succinate; vinyl ethers such as 2-hydroxyethyl vinyl ether and 2-hydroxypropyl vinyl ether; mono(meth)allyl ethers of alkylene glycols such as (meth)allyl-2-hydroxyethyl ether and (meth)allyl-2-hydroxypropyl ether; polyoxyalkylene glycol mono(meth)allyl ethers such as diethylene glycol mono(meth)allyl ether and dipropylene glycol mono(meth)allyl ether; mono(meth)allyl ethers of halogen or hydroxy substituted (poly)alkylene glycols such as glycerin mono(meth)allyl ether and (meth)allyl-2-chloro-3-hydroxypropyl ether; mono(meth)allyl ethers of polyhydric phenols such as eugenol and isoeugenol, and halogen substituted products thereof; and (meth)allyl thioethers of alkylene glycols such as (meth)allyl-2-hydroxyethyl thioether and (meth)allyl-2-hydroxypropyl thioether.

The proportional content of the hydrophilic group-containing monomer unit in the polymer when all repeating units in the polymer are taken to be 100 mass % is preferably 15 mass % or less, more preferably 10 mass % or less, and even more preferably 4.5 mass % or less, and is preferably 0.1 mass % or more, and more preferably 1.0 mass % or more. When the proportional content of the hydrophilic group-containing monomer unit in the polymer is not more than any of the upper limits set forth above, viscosity stability of the obtained slurry composition can be further increased. Moreover, when the proportional content of the hydrophilic group-containing monomer unit in the polymer is not more than any of the upper limits set forth above, close adherence to a current collector of a positive electrode mixed material layer formed using the obtained slurry composition can be increased, and, as a result, resistance of an obtained secondary battery can be reduced. Furthermore, when the proportional content of the hydrophilic group-containing monomer unit in the polymer is not less than any of the lower limits set forth above, sedimentation resistance of the obtained slurry composition can be further increased. By using a slurry composition that has excellent sedimentation resistance, it is possible to form a homogeneous positive electrode mixed material layer having a good electrical conduction network and to reduce the resistance of an obtained secondary battery.

pH of Extract

The pH of an extract of the polymer obtained by a specific method is required to be not lower than 3.5 and lower than 6.0. The pH of the extract of the polymer is preferably 4.0 or higher, and more preferably 4.2 or higher, and is preferably 5.5 or lower, more preferably 5.0 or lower, and even more preferably 4.8 or lower. When the pH of the extract is not lower than any of the lower limits set forth above, sedimentation resistance of the obtained slurry composition can be further increased. Moreover, when the pH of the extract satisfies any the upper limit side conditions set forth above, the obtained slurry composition can be inhibited from readily thickening as time passes after production thereof, and viscosity stability of the slurry composition can be increased. Note that the pH of the extract of the polymer can be adjusted by altering treatment conditions in production of the polymer. More specifically, the pH of the extract can be adjusted through addition of a pH modifier, buffer solution, or the like to a reaction liquid in production of the polymer as described further below.

Iodine Value

The iodine value of the polymer is preferably 60 g/100 g or less, more preferably 40 g/100 g or less, and even more preferably 20 g/100 g or less. A polymer having an iodine value that is not more than any of the upper limits set forth above can reduce the resistance of a secondary battery obtained using the slurry composition. The iodine value of the polymer can be 3 g/100 g or more, for example. In a case in which the polymer is a hydrogenated polymer, the iodine value of the polymer can be adjusted by altering the conditions in the hydrogenation reaction.

Production Method of Polymer

No specific limitations are placed on the method by which the polymer described above is produced. For example, the polymer can be produced by polymerizing a monomer composition containing the monomers described above in the presence of a polymerization initiator, optional additives, and so forth to obtain a polymer, and subsequently hydrogenating the obtained polymer. In addition, a pH modifier or a buffer solution may be added to a reaction liquid containing the polymer that has undergone hydrogenation. Through addition of a pH modifier or a buffer solution to the reaction liquid, it is possible to adjust the pH of the extract of the polymer to a desired value. The type of pH modifier or buffer solution can be selected as appropriate depending on the chemical composition of the monomer composition that is used to produce the polymer, the target extract pH, and so forth.

The proportional content of each monomer in the monomer composition used to produce the polymer can be set in accordance with the proportional content of each repeating unit in the polymer.

The polymerization method is not specifically limited, and any of solution polymerization, suspension polymerization, bulk polymerization, and emulsion polymerization may be used.

Moreover, the method of hydrogenation of the polymer is not specifically limited and can be oil-layer hydrogenation, water-layer direct hydrogenation, water-layer indirect hydrogenation (for example, refer to WO2013/080989A1, etc.), or the like, which are typical methods using a catalyst.

Positive Electrode Active Material

The positive electrode active material is required to be a positive electrode active material having a chemical composition represented by the following formula (I).

$$Li_\alpha Ni_a Co_b Mn_c O_{2-(\beta/2)} X_\beta \quad (I)$$

In formula (I), M is an element selected from the group consisting of Mg, Al, Cr, V, Ti, Cr, Fe, Zr, Zn, Si, Y, Nb, Ga, Sn, Mo, W, and combinations thereof. Of these elements, any one of Al, Mg, Zr, and Ti is preferable as M.

X is a halogen element. Of halogen elements, any one of F, Cl, Br, and I is preferable, and F is more preferable as X.

$\alpha$, $\beta$, a, b, c, and d satisfy the following conditions (1) to (8).

$$0.90 \leq \alpha \leq 1.5 \quad (1)$$

$$0 \leq \beta \leq 0.1 \quad (2)$$

$$0.55 \leq a \leq 0.9 \quad (3)$$

$$0 \leq b \leq 0.45 \quad (4)$$

$$0 \leq c \leq 0.45 \quad (5)$$

$$0 \leq d \leq 0.1 \quad (6)$$

$$0.1 \leq b+c+d \leq 0.45 \quad (7)$$

$$a+b+c+d=1 \quad (8)$$

Among these conditions, condition (1) is preferably $0.95 \leq \alpha \leq 1.2$, and a is more preferably 1.

Condition (2) is preferably $0 \leq \beta \leq 0.05$, and β is more preferably 0.

Condition (3) is preferably $0.6 \leq a \leq 0.8$.

Condition (4) is preferably $0 < b \leq 0.3$.

Condition (5) is preferably $0 < c \leq 0.3$.

Condition (6) is preferably $0 \leq d \leq 0.05$, and d is more preferably 0.

Condition (7) is preferably $0.2 \leq b+c+d \leq 0.4$.

Examples of positive electrode active materials having a chemical composition represented by formula (I) that can suitably be used include $Li(Ni_{0.8}Co_{0.1}Mn_{0.1})O_2$, $Li(Ni_{0.6}Co_{0.2}Mn_{0.2})O_2$, and the like.

The amount and particle diameter of the positive electrode active material may be, but are not specifically limited to, the same as those of conventionally used positive electrode active materials.

Organic Solvent

Examples of organic solvents that can be used include ketones such as acetone, ethyl methyl ketone, and cyclohexanone, esters such as ethyl acetate and butyl acetate, ethers such as diethyl ether, dioxane, and tetrahydrofuran, amide polar organic solvents such as N,N-dimethylformamide and N-methyl-2-pyrrolidone (NMP), and aromatic hydrocarbons such as toluene, xylene, chlorobenzene, orthodichlorobenzene, and paradichlorobenzene. The specific polymer described above has excellent solubility in various organic solvents such as those listed above. One of these organic solvents may be used individually, or two or more of these organic solvents may be used as a mixture. Of these examples, it is preferable that an organic solvent including at least NMP is used as the organic solvent, and more preferable that NMP is used by itself as the organic solvent from a viewpoint of handleability.

Conductive Material

The conductive material is a component that can be compounded in order to promote electrical contact among an electrode active material in a positive electrode mixed material layer. The conductive material is preferably a carbon material. More specifically, conductive carbon materials such as carbon black (for example, acetylene black, Ketjenblack® (Ketjenblack is a registered trademark in Japan, other countries, or both), and furnace black), graphite, carbon fiber, and carbon flake; and fibers, foils, and the like of various metals can suitably be used as the conductive material. Of these examples, the conductive material more preferably includes carbon fiber, even more preferably includes carbon nanofiber such as carbon nanotubes or vapor-grown carbon fiber, and particularly preferably includes carbon nanotubes.

One of these conductive materials may be used individually, or two or more of these conductive materials may be used in combination.

The BET specific surface area of the conductive material is preferably 20 $m^2/g$ or more, more preferably 50 $m^2/g$ or more, and even more preferably 100 $m^2/g$ or more, and is preferably 2,000 $m^2/g$ or less, more preferably 1,500 $m^2/g$ or less, and even more preferably 700 $m^2/g$ or less. When the BET specific surface area of the conductive material is not less than any of the lower limits set forth above, good electrical conduction paths can be formed in a positive electrode mixed material layer, and initial resistance of a secondary battery can be reduced. Moreover, when the BET specific surface area of the conductive material is not more than any of the upper limits set forth above, the solid content concentration of the obtained slurry composition can be increased well. Note that the BET specific surface area of the conductive material is the nitrogen adsorption specific surface area measured using the BET method and can be measured by a method described in the EXAMPLES section.

Other Components

Besides the components described above, the slurry composition may contain components such as a binder that is a polymer having a different chemical composition to the polymer described above and known additives such as those described in JP6044773B2. One of these components may be used individually, or two or more of these components may be used in combination in a freely selected ratio.

The binder that is a polymer having a different chemical composition to the polymer described above may be polyacrylonitrile, polymethyl methacrylate, a fluorine-containing polymer such as polyvinylidene fluoride (PVDF), or the like, for example. Of these binders, PVDF can suitably be used from a viewpoint of reducing the resistance of an obtained secondary battery. The binder differs from the polymer described above in terms that it does not include either or both of a nitrile group-containing monomer unit and a linear alkylene structural unit having a carbon number of 4 or more or that the pH of an extract obtained from the binder by a specific method may be lower than 3.5 or may be 6.0 or higher. Note that the binder is a component that, in a positive electrode mixed material layer formed using the slurry composition, holds components such as the positive electrode active material and the conductive material so that these components do not detach from the positive electrode mixed material layer and can cause adhesion of battery members through the positive electrode mixed material layer.

Amount of Polymer

The amount of the specific polymer in the slurry composition per 100 parts by mass of the positive electrode active material is preferably 0.05 parts by mass or more, more preferably 0.10 parts by mass or more, and even more preferably 0.15 parts by mass or more, and is preferably 2.0 parts by mass or less, more preferably 1.0 parts by mass or less, and even more preferably 0.5 parts by mass or less. When the amount of the polymer is an amount satisfying any of the lower limit threshold values set forth above, viscosity stability of the slurry composition can be further increased. Moreover, by further increasing viscosity stability of the slurry composition, initial efficiency of an obtained secondary battery can be increased, and resistance of the secondary battery can be reduced. Moreover, when the amount of the polymer is not more than any of the upper limits set forth above, the resistance of a secondary battery that includes a positive electrode formed using the slurry composition can be reduced.

Amount of Conductive Material

The amount of the conductive material in the slurry composition is preferably not less than 0.5 parts by mass and not more than 3.0 parts by mass per 100 parts by mass of the positive electrode active material. This is because good electrical conduction paths can be formed in a positive electrode mixed material layer and the resistance of a secondary battery can be further reduced when the amount of the conductive material is within this range.

Amount of Binder

The amount of a binder that is a polymer having a different chemical composition to the specific polymer is preferably 0.5 parts by mass or more, more preferably 1.0 parts by mass or more, and even more preferably 1.5 parts by mass or more per 100 parts by mass of the positive electrode active material, and is preferably 5.0 parts by mass or less, more preferably 4.0 parts by mass or less, and even more preferably 3.0 parts by mass or less per 100 parts by mass of the positive electrode active material. When the amount of the binder is not less than any of the lower limits set forth above, close adherence between a current collector and a positive electrode mixed material layer formed using the slurry composition can be increased. Moreover, when the amount of the binder is not more than any of the upper limits set forth above, the resistance of an obtained secondary battery can be further reduced.

Mixing Step

The slurry composition set forth above can, without any specific limitations, be produced by mixing the components described above and the organic solvent so as to dissolve or disperse the components in the organic solvent, for example. The method by which the components are dissolved or dispersed in the organic solvent may, for example, be a method using a mixer such as a ball mill, a sand mill, a bead mill, a pigment disperser, a grinding machine, an ultrasonic disperser, a homogenizer, a planetary mixer, or a FILMIX. The components may be mixed all at once or may be mixed in stages. Note that organic solvent contained in a polymer solution that is obtained in production of the polymer may serve as the organic solvent that is used in the mixing step.

Method of Producing Positive Electrode for Secondary Battery

The presently disclosed method of producing a positive electrode for a secondary battery includes a slurry composition production step of producing a slurry composition for a secondary battery positive electrode by the presently disclosed method of producing a slurry composition for a secondary battery positive electrode and a step of applying the slurry composition obtained in the slurry composition production step onto at least one side of a current collector and drying the slurry composition to form a positive electrode mixed material layer. A positive electrode that is obtained by the presently disclosed method of producing a positive electrode for a secondary battery includes a current collector and a positive electrode mixed material layer disposed on at least one side of the current collector. The positive electrode mixed material layer contains at least a positive electrode active material and a polymer and optionally contains other components such as a binder and a conductive material. Note that components contained in the positive electrode mixed material layer are components that were contained in the slurry composition for a secondary battery positive electrode obtained by the production method set forth above, and the preferred ratio of these components is also the same as the preferred ratio of the components in the slurry composition.

As a result of a positive electrode for a secondary battery obtained by the presently disclosed production method being produced using a slurry composition for a secondary battery positive electrode that has been obtained by the presently disclosed production method, a secondary battery having excellent battery characteristics can be formed by using this positive electrode.

In more detail, the presently disclosed method of producing a positive electrode for a secondary battery includes a slurry composition production step of producing a slurry composition by the presently disclosed production method set forth above, a step of applying the slurry composition obtained in the aforementioned step onto at least one side of a current collector (application step), and a step of drying the slurry composition that has been applied onto at least one side of the current collector to form a positive electrode mixed material layer on at least one side of the current collector (drying step).

Application Step

The slurry composition may be applied onto at least one side of the current collector by any commonly known method without any specific limitations. Specific examples of application methods that can be used include doctor blading, dip coating, reverse roll coating, direct roll coating, gravure coating, extrusion coating, and brush coating. It is necessary for the slurry composition to be applied onto at least one side of the current collector, but the slurry composition may be applied onto both sides of the current collector as necessary. The thickness of the slurry coating on the current collector after application but before drying may be set as appropriate in accordance with the thickness of the positive electrode mixed material layer that is to be obtained after drying.

The current collector onto which the slurry composition is applied is a material having electrical conductivity and electrochemical durability. Specifically, the current collector may, for example, be made of iron, copper, aluminum, nickel, stainless steel, titanium, tantalum, gold, platinum, or the like. Of these materials, aluminum foil is particularly preferable as a current collector used for a positive electrode. One of these materials may be used individually, or two or more of these materials may be used in combination in a freely selected ratio.

Drying Step

The slurry composition on the current collector may be dried by any commonly known method without any specific limitations. Examples of drying methods that can be used include drying by warm, hot, or low-humidity air; drying in a vacuum; and drying by irradiation with infrared light, electron beams, or the like. Through drying of the slurry composition on the current collector in this manner, a positive electrode mixed material layer is formed on the current collector and thus a positive electrode for a secondary battery including the current collector and the positive electrode mixed material layer can be obtained.

After the drying step, the positive electrode mixed material layer may be further subjected to a pressing process such as mold pressing or roll pressing. The pressing process can effectively increase the density of the positive electrode mixed material layer and can also improve close adherence of the positive electrode mixed material layer and the current collector. Furthermore, when the positive electrode mixed material layer contains a curable polymer, the polymer is preferably cured after the positive electrode mixed material layer has been formed.

Method of Producing Secondary Battery

The presently disclosed method of producing a secondary battery is a method of producing a secondary battery including a positive electrode, a negative electrode, an electrolyte solution, and a separator and includes a step of producing the positive electrode by the presently disclosed method of producing a positive electrode for a secondary battery set forth above. A secondary battery that is obtained by the presently disclosed production method has excellent battery characteristics as a result of including a positive electrode for a secondary battery that has been obtained by the presently disclosed production method.

Although the following describes, as one example, a case in which the secondary battery is a lithium ion secondary battery, the present disclosure is not limited to the following example.

Negative Electrode

The negative electrode may be any known negative electrode. Specifically, the negative electrode may, for example, be a negative electrode formed of a thin sheet of lithium metal or a negative electrode obtained by forming a negative electrode mixed material layer on a current collector.

The current collector may be made of a metal material such as iron, copper, aluminum, nickel, stainless steel, titanium, tantalum, gold, or platinum. The negative electrode mixed material layer may be a layer that contains a negative electrode active material and a binder. The binder is not specifically limited and may be freely selected from known materials.

Electrolyte Solution

The electrolyte solution is normally an organic electrolyte solution obtained by dissolving a supporting electrolyte in an organic solvent. The supporting electrolyte of the lithium ion secondary battery may, for example, be a lithium salt. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable because they readily dissolve in solvents and exhibit a high degree of dissociation, with $LiPF_6$ being particularly preferable. One electrolyte may be used individually, or two or more electrolytes may be used in combination in a freely selected ratio. In general, lithium ion conductivity tends to increase when a supporting electrolyte having a high degree of dissociation is used. Therefore, lithium ion conductivity can be adjusted through the type of supporting electrolyte that is used. The concentration (25° C.) of the supporting electrolyte in the electrolyte solution can be not less than 0.5 mol/L and not more than 2.0 mol/L, for example.

The organic solvent used in the electrolyte solution is not specifically limited so long as the supporting electrolyte can dissolve therein. Examples of suitable organic solvents include carbonates such as dimethyl carbonate (DMC), ethylene carbonate (EC), diethyl carbonate (DEC), propylene carbonate (PC), butylene carbonate (BC), and ethyl methyl carbonate (EMC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having high permittivity and a wide stable potential region, with the use of a mixture of ethylene carbonate and diethyl carbonate being preferable. An additive such as vinylene carbonate (VC), fluoroethylene carbonate, or ethyl methyl sulfone may be added to the electrolyte solution.

Separator

A known separator such as an organic separator may be used as the separator without any specific limitations. The organic separator is a porous member that is formed of an organic material and may, for example, be a microporous membrane or non-woven fabric containing a polyolefin resin such as polyethylene or polypropylene, an aromatic polyamide resin, or the like.

In the presently disclosed method of producing a secondary battery, once the step of producing a positive electrode by the presently disclosed method of producing a positive electrode for a secondary battery set forth above has been implemented, the obtained positive electrode and the negative electrode may be stacked with the separator in-between, the resultant laminate may be subjected to rolling, folding, or the like in accordance with the battery shape as necessary to place the laminate in a battery container, the electrolyte solution may be injected into the battery container, and the battery container may be sealed. In order to prevent pressure increase inside the secondary battery and occurrence of overcharging or overdischarging, an overcurrent preventing device such as a fuse or a PTC device; an expanded metal; or a lead plate may be provided as necessary. The shape of the secondary battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Various evaluations and measurements in the examples and comparative examples were performed by the following methods.

pH of Extract of Polymer

An NMP solution of a polymer A produced in each example or comparative example was adjusted to a solid content concentration of 8.0%. After adding 90 g of deionized water to 10 g of the NMP solution of the polymer A, a lab spoon was used to perform stirring and pressing, and liquid encapsulated in coagulated polymer A was extracted in a deionized water phase to obtain an extract. The pH of the extract was measured at 25° C. in accordance with JIS Z8802(2011).

Iodine Value of Polymer

After coagulating 100 g of a water dispersion of a polymer A or a precursor (particulate polymer) of the polymer A produced in each example or comparative example in 1 L of methanol, 12 hours of vacuum drying was performed at a temperature of 60° C. The iodine value of the resultant dry polymer was measured in accordance with JIS K6235 (2006).

Mass % of Each Monomer Unit in Polymer

After coagulating 100 g of a water dispersion of a precursor (particulate polymer) of a polymer A produced in each example or comparative example in 1 L of methanol, 12 hours of vacuum drying was performed at a temperature of 60° C. The resultant dry polymer was dissolved in deuterated chloroform to obtain a 1 mass % solution that was used to determine the content ratio of monomer units by $^1$H-NMR using a nuclear magnetic resonance spectrometer (AVANCE III 600 produced by Bruker Corporation).

Chemical Composition Analysis of Positive Electrode Active Material

The chemical composition of each positive electrode active material used in the examples and comparative examples was analyzed using an ICP optical emission spectrometer (ICPS-7500 produced by Shimadzu Corporation).

Specific Surface Area of Conductive Material

A value for the BET specific surface area of a conductive material was measured using a BELSORP®-max (BEL-SORP is a registered trademark in Japan, other countries, or both) produced by Bel Japan Inc.

Sedimentation Resistance of Slurry Composition

For each slurry composition produced in the examples and comparative examples, a supernatant thereof was sampled as a measurement sample both 1 minute after production and 24 hours after production. Values for the solid content concentrations of these measurement samples were obtained, and a ratio of the value for 24 hours after production relative to the value for 1 minute after production was determined so as to calculate the solid content concentration maintenance rate S (%). A large value for the obtained solid content concentration maintenance rate S indicates that the amount of solid content contained in the supernatant portion is large even at a point 24 hours after production, and thus indicates that the amount of solid content that has not sedimented is large. Accordingly, a larger value for the solid content concentration maintenance rate S indicates that sedimentation occurs less readily in the slurry composition and that the slurry composition has better sedimentation resistance. By using a slurry composition having excellent sedimentation resistance, it is possible to produce a uniform positive electrode. Moreover, a secondary battery including such a positive electrode has high initial efficiency and low resistance.

A: S of not less than 97% and not more than 100%
B: S of not less than 91% and less than 97%
C: S of not less than 85% and less than 91%
D: S of less than 85%

Viscosity Stability of Slurry Composition

For each slurry composition produced in the examples and comparative examples, a value of the viscosity 1 hour after production and a value of the viscosity 2 weeks after production were measured. These viscosities were measured using a B-type viscometer. A ratio of the increase of the value of the viscosity 2 weeks after production relative to the value of the viscosity 1 hour after production was determined so as to calculate the viscosity change rate V (%). A lower value for the viscosity change rate V (%) indicates that the slurry composition is more resistant to thickening over time, and thus indicates that the slurry composition has better viscosity stability. By using a slurry composition having excellent viscosity stability, it is possible to form a uniform positive electrode and also to increase the initial efficiency and reduce the resistance of a secondary battery that includes this positive electrode.

A: V of less than 40%
B: V of not less than 40% and less than 80%
C: V of not less than 80% and less than 120%
D: V of not less than 120% and less than 200%
E: V of 200% or more Initial Efficiency of Secondary Battery A secondary battery produced in each example or comparative example was subjected to three cycles of an operation of charging to 4.2 V and discharging to 3.0 V at 0.2C in a 25° C. environment. The secondary battery was subsequently charged to a battery voltage of 4.2 V at 1C and discharged to a battery voltage of 3.0 V at 1C, and a ratio of the amount of discharge relative to the amount of charge in this charging and discharging was evaluated.

A: Charge/discharge efficiency of 97% or more
B: Charge/discharge efficiency of not less than 95% and less than 97%
C: Charge/discharge efficiency of not less than 93% and less than 95%
D: Charge/discharge efficiency of less than 93%

Resistance of Secondary Battery

A secondary battery produced in each example or comparative example was constant-current charged to a battery voltage of 4.2 V at 0.2C and subsequently constant-voltage charged to a charging current of 0.02C at 4.2 V in a 25° C. environment. Next, constant-current discharging was performed to a battery voltage of 3.87 V (SOC: 50%) at 0.2C. Thereafter, the voltage change after 30 seconds of discharging was measured for each of 0.2C, 0.5C, 1.0C, 2.0C, 2.5C, and 3.0C. The discharge currents and measured voltage changes were plotted and the gradient of the plot was taken as a resistance value (a). The calculated resistance value was evaluated by the following standard. A smaller resistance value indicates that the secondary battery has better battery characteristics.

A: Resistance value of less than 0.5Ω
B: Resistance value of not less than 0.5Ω and less than 1Ω
C: Resistance value of 1Ω or more Example 1

Production of Polymer A

A reactor was charged, in order, with 180 parts of deionized water, 25 parts of sodium dodecylbenzenesulfonate aqueous solution of 10% in concentration, 21 parts of acrylonitrile as a nitrile group-containing monomer, 36 parts of styrene as an aromatic vinyl monomer, 4 parts of methacrylic acid as a hydrophilic group-containing monomer, and 2 parts of t-dodecyl mercaptan as a chain transfer agent.

Next, gas inside the reactor was purged three times with nitrogen, and then 39 parts of 1,3-butadiene as a conjugated diene monomer capable of introducing a linear alkylene structural unit having a carbon number of 4 or more into a polymer A was charged to the reactor. The reactor was held at 10° C. while 0.1 parts of cumene hydroperoxide as a polymerization initiator and appropriate amounts of a reductant and a chelating agent were charged thereto. A polymerization reaction was continued under stirring until the polymerization conversion rate reached 85%, at which point, 0.1 parts of hydroquinone aqueous solution of 10% in concentration was added as a polymerization inhibitor to terminate the polymerization reaction. Next, residual monomer was removed at a water temperature of 80° C. to yield a water dispersion of a precursor (particulate polymer) of a polymer A. The iodine value and the mass % of each monomer unit were measured for the obtained particulate polymer as previously described.

The obtained water dispersion of the precursor and a palladium catalyst (solution obtained by mixing 1% palladium acetate acetone solution and an equivalent mass of deionized water) were added into an autoclave such that the palladium content relative to the mass of solid content contained in the water dispersion was 5,000 ppm, and a hydrogenation reaction was performed at a hydrogen pressure of 3 MPa and a temperature of 50° C. for 6 hours to yield a reaction liquid. The obtained reaction liquid was adjusted to pH 4 through addition of 1% sulfuric acid aqueous solution and 1% potassium chloride aqueous solution as a buffer solution to yield a water dispersion of a target polymer A. The iodine value of the obtained polymer A was measured as previously described. The result is shown in Table 1. Upon comparison of the iodine value of the polymer A and the iodine value of the precursor (particulate polymer) of the polymer A measured as described above, the polymer A was confirmed to include a hydrogenated butadiene unit (i.e., a linear alkylene structural unit having a carbon number of 4) based on the iodine value of the polymer A being lower than the iodine value of the particulate polymer.

Solvent Exchange of Water Dispersion of Polymer A

The water dispersion of the polymer A and an appropriate amount of NMP as an organic solvent were mixed. Next, water contained in the resultant mixture was completely evaporated under reduced pressure to obtain an NMP solution of the polymer A. This NMP solution of the polymer A was used to measure the pH of an extract as previously described. The result is shown in Table 1.

Production of Slurry Composition for Secondary Battery Positive Electrode and Production of Positive Electrode A slurry composition for a positive electrode was produced by adding 100 parts of $Li(Ni_{0.8}Co_{0.1}Mn_{0.1})O_2$ as a positive electrode active material satisfying the specific chemical composition, 1 part of multi-walled carbon nanotubes (BET specific surface area: 160 $m^2/g$) as a conductive material, 0.2 parts of the polymer A, 2 parts in terms of solid content of polyvinylidene fluoride (PVdF) as a binder, and NMP as an organic solvent, and performing stirring (60 rpm, 30 minutes) thereof in a planetary mixer. Note that the additive amount of NMP was adjusted such that the viscosity of the obtained slurry composition for a positive electrode (measured by a single cylinder rotary viscometer in accordance with JIS Z8803:1991; temperature: 25° C.; rotation speed: 60 rpm) was within a range of 4,000 mPa·s to 5,000 mPa·s.

Production of Positive Electrode

Aluminum foil of 20 μm in thickness was prepared as a current collector. The slurry composition for a positive electrode described above was applied onto the aluminum foil using a comma coater such as to have a coating weight after drying of 20 $mg/cm^2$. The applied slurry composition for a positive electrode was dried at 90° C. for 20 minutes and at 120° C. for 20 minutes, and was subsequently heat treated at 60° C. for 10 hours to obtain a positive electrode web. The positive electrode web was rolled by roll pressing to produce a sheet-shaped positive electrode including the aluminum foil and a positive electrode mixed material layer of 3.2 $g/cm^3$ in density. The thickness of the sheet-shaped positive electrode was 70 μm. The sheet-shaped positive electrode was cut to 4.8 cm in width and 50 cm in length to obtain a positive electrode for a lithium ion secondary battery.

Production of Negative Electrode for Lithium Ion Secondary Battery

A slurry composition for a negative electrode was produced by stirring a mixture of 90 parts of spherical artificial graphite (volume-average particle diameter: 12 μm) and 10 parts of $SiO_x$ (volume-average particle diameter: 10 μm) as a negative electrode active material, 1 part of a styrene butadiene polymer as a binder, 1 part of carboxymethyl cellulose as a thickener, and an appropriate amount of water as a dispersion medium in a planetary mixer.

Next, copper foil of 15 μm in thickness was prepared as a current collector. The slurry composition for a negative electrode described above was applied onto both sides of the copper foil such as to have a coating weight after drying of 10 $mg/cm^2$ at each side and was dried at 60° C. for 20 minutes and at 120° C. for 20 minutes. Thereafter, 2 hours of heat treatment was performed at 150° C. to obtain a negative electrode web. The negative electrode web was rolled by roll pressing to produce a sheet-shaped negative electrode including the copper foil and negative electrode mixed material layers (both sides) of 1.8 $g/cm^3$ in density. The sheet-shaped negative electrode was cut to 5.0 cm in width and 52 cm in length to obtain a negative electrode for a lithium ion secondary battery.

Preparation of Separator

A separator made of a single layer of polypropylene (produced by Celgard, LLC.; product name: Celgard 2500; microporous membrane made of polypropylene of 15 μm in thickness) was cut out as 120 cm×5.5 cm.

Production of Lithium Ion Secondary Battery

The positive electrode and negative electrode described above were wound using a core of 20 mm in diameter with the separator described above interposed therebetween so as to obtain a roll. The obtained roll was compressed to a thickness of 4.5 mm from one direction at a rate of 10 mm/s. Note that the compressed roll had an elliptical shape in plan view, and the ratio of the major axis to the minor axis thereof (major axis/minor axis) was 7.7.

In addition, an electrolyte solution was prepared (chemical composition: LiPF$_6$ solution of 1.0 mol/L in concentration (solvent: mixed solution obtained by adding 5 mass % of fluoroethylene carbonate to a mixed solvent of ethylene carbonate/ethyl methyl carbonate=3/7 (mass ratio); additive: 2 volume % of vinylene carbonate)).

The compressed roll was subsequently housed in an aluminum laminate case together with 3.2 g of the non-aqueous electrolyte solution. After connecting a nickel lead to a specific location on the negative electrode and connecting an aluminum lead to a specific location on the positive electrode, an opening of the case was heat sealed to obtain a lithium ion secondary battery. This lithium ion secondary battery was a pouch shape of a specific size capable of housing the roll and had a battery nominal capacity of 700 mAh. Initial efficiency and resistance were evaluated for the obtained lithium ion secondary battery as previously described. The results are shown in Table 1.

Example 2

Various operations, measurements, and evaluations were performed in the same way as in Example 1 with the exception that the positive electrode active material used in production of the slurry composition for a secondary battery positive electrode was changed to a ternary active material Li(Ni$_{0.6}$Co$_{0.2}$Mn$_{0.2}$)O$_2$ having a layered structure. The results are shown in Table 1.

Example 3

Various operations, measurements, and evaluations were performed in the same way as in Example 1 with the exception that the conductive material used in production of the slurry composition was changed to 2 parts of acetylene black (DENKA BLACK® (DENKA BLACK is a registered trademark in Japan, other countries, or both) produced by Denka Company Limited; powdered product; BET specific surface area: 70 m$^2$/g). The results are shown in Table 1.

Examples 4 and 5

Various operations, measurements, and evaluations were performed in the same way as in Example 1 with the exception that the additive amount of the buffer solution in production of the polymer A was adjusted such that the pH of an extract of the polymer A was as indicated in Table 1. The results are shown in Table 1.

Examples 6 and 7

Various operations, measurements, and evaluations were performed in the same way as in Example 1 with the exception that the amount of the polymer A used in production of the slurry composition was changed as indicated in Table 1. The results are shown in Table 1.

Example 8

Various operations, measurements, and evaluations were performed in the same way as in Example 1 with the exception that a condition (palladium content relative to mass of solid content contained in water dispersion of precursor of polymer A) of the hydrogenation reaction in production of the polymer A was changed such that the iodine value of the polymer A was as indicated in Table 1. The results are shown in Table 1.

Examples 9 to 12

Various operations, measurements, and evaluations were performed in the same way as in Example 1 with the exception that the amounts of monomers used in production of the polymer A were changed such that the proportion (mass %) constituted by each unit in the obtained polymer A was as indicated in Table 1. The results are shown in Table 1.

Example 13

Various operations, measurements, and evaluations were performed in the same way as in Example 1 with the exception that the binder compounded in production of the slurry composition for a secondary battery positive electrode was changed to polyacrylonitrile (PAN). The results are shown in Table 1.

Comparative Examples 1 to 3

Various operations were performed in the same way as in Example 1 with the exception that the additive amount of the buffer solution in production of the polymer A was adjusted such that the pH of an extract of the polymer A was as indicated in Table 1. However, it was not possible to form a positive electrode mixed material layer in Comparative Example 1 because the viscosity stability of the obtained slurry composition was remarkably poor, and it was also not possible to produce a slurry composition for a secondary battery positive electrode that could form a positive electrode mixed material layer in Comparative Example 3, and thus evaluations using a secondary battery could not be performed.

In Comparative Example 2, various measurements and evaluations were performed in the same way as in Example 1 with the exception of the above. The results are shown in Table 1.

In Table 1:

"H-BD" indicates hydrogenated butadiene monomer unit (linear alkylene structural unit having carbon number of 4);

"BD" indicates 1,3-butadiene monomer unit;

"AN" indicates acrylonitrile monomer unit;

"ST" indicates styrene monomer unit;

"MAA" indicates methacrylic acid monomer unit;

"NMC811" indicates Li(Ni$_{0.8}$Co$_{0.1}$Mn$_{0.1}$)O$_2$;

"NMC622" indicates Li(Ni$_{0.6}$Co$_{0.2}$Mn$_{0.2}$)O$_2$;

"MWCNT" indicates multi-walled carbon nanotubes;

"AB" indicates acetylene black;

"NMP" indicates N-methyl-2-pyrrolidone;

"PVdF" indicates polyvinylidene fluoride; and

"PAN" indicates polyacrylonitrile.

TABLE 1

|  |  |  |  | Examples | | | | | | | |
|---|---|---|---|---|---|---|---|---|---|---|---|
|  |  |  |  | 1 | 2 | 3 | 4 | 5 | 6 | 7 | 8 |
| Slurry composition | Positive electrode active material | Type | | NCM811 | NCM622 | NCM811 | NCM811 | NCM811 | NCM811 | NCM811 | NCM811 |
|  |  | Amount (parts by mass) | | 100 | 100 | 100 | 100 | 100 | 100 | 100 | 100 |
|  | Conductive material | Type | | MWCNT | MWCNT | AB | MWCNT | MWCNT | MWCNT | MWCNT | MWCNT |
|  |  | Specific surface area ($m^2/g$) | | 160 | 160 | 70 | 160 | 160 | 160 | 160 | 160 |
|  |  | Amount (parts by mass) | | 1 | 1 | 2 | 1 | 1 | 1 | 1 | 1 |
|  | Polymer A | Monomer units | H-BD, BD (mass %) | 40 | 40 | 40 | 40 | 40 | 40 | 40 | 40 |
|  |  |  | AN (mass %) | 23 | 23 | 23 | 23 | 23 | 23 | 23 | 23 |
|  |  |  | ST (mass %) | 33 | 33 | 33 | 33 | 33 | 33 | 33 | 33 |
|  |  |  | MAA (mass %) | 4 | 4 | 4 | 4 | 4 | 4 | 4 | 4 |
|  |  | Extract pH (—) | | 4.5 | 4.5 | 4.5 | 3.7 | 5.3 | 4.5 | 4.5 | 4.5 |
|  |  | Iodine value (g/100 g) | | 10 | 10 | 10 | 10 | 10 | 10 | 10 | 35 |
|  |  | Amount (parts by mass) | | 0.2 | 0.2 | 0.2 | 0.2 | 0.2 | 0.08 | 0.8 | 0.2 |
|  | Binder | Type | | PVdF | PVdF | PVdF | PVdF | PVdF | PVdF | PVdF | PVdF |
|  |  | Amount (parts by mass) | | 2 | 2 | 2 | 2 | 2 | 2 | 2 | 2 |
|  | Organic solvent | Type | | NMP | NMP | NMP | NMP | NMP | NMP | NMP | NMP |
| Evaluation | Sedimentation resistance of slurry composition | | | A | A | A | B | A | A | A | A |
|  | Viscosity stability of slurry composition | | | A | A | A | A | B | B | A | A |
|  | Initial efficiency of secondary battery | | | A | A | A | B | B | B | A | A |
|  | Resistance of secondary battery | | | A | A | B | B | B | B | B | B |

|  |  |  |  | Examples | | | | | Comparative examples | | |
|---|---|---|---|---|---|---|---|---|---|---|---|
|  |  |  |  | 9 | 10 | 11 | 12 | 13 | 1 | 2 | 3 |
| Slurry composition | Positive electrode active material | Type | | NCM811 | NCM811 | NCM811 | NCM811 | NCM811 | NCM811 | NCM811 | NCM811 |
|  |  | Amount (parts by mass) | | 100 | 100 | 100 | 100 | 100 | 100 | 100 | 100 |
|  | Conductive material | Type | | MWCNT | MWCNT | MWCNT | MWCNT | MWCNT | MWCNT | MWCNT | MWCNT |
|  |  | Specific surface area ($m^2/g$) | | 160 | 160 | 160 | 160 | 160 | 160 | 160 | 160 |
|  |  | Amount (parts by mass) | | 1 | 1 | 1 | 1 | 1 | 1 | 1 | 1 |
|  | Polymer A | Monomer units | H-BD, BD (mass %) | 39 | 64 | 42 | 62 | 40 | 40 | 40 | 40 |
|  |  |  | AN (mass %) | 23 | 36 | 24 | 34 | 23 | 23 | 23 | 23 |
|  |  |  | ST (mass %) | 33 | 0 | 34 | 0 | 33 | 33 | 33 | 33 |
|  |  |  | MAA (mass %) | 5 | 0 | 0 | 4 | 4 | 4 | 4 | 4 |
|  |  | Extract pH (—) | | 4.5 | 4.5 | 4.5 | 4.5 | 4.5 | 3.0 | 6.0 | 8.0 |
|  |  | Iodine value (g/100 g) | | 10 | 10 | 10 | 10 | 10 | 10 | 10 | 10 |
|  |  | Amount (parts by mass) | | 0.2 | 0.2 | 0.2 | 0.2 | 0.2 | 0.2 | 0.2 | 0.2 |
|  | Binder | Type | | PVdF | PVdF | PVdF | PVdF | PAN | PVdF | PVdF | PVdF |
|  |  | Amount (parts by mass) | | 2 | 2 | 2 | 2 | 2 | 2 | 2 | 2 |
|  | Organic solvent | Type | | NMP | NMP | NMP | NMP | NMP | NMP | NMP | NMP |
| Evaluation | Sedimentation resistance of slurry composition | | | A | B | B | A | A | D | A | A |
|  | Viscosity stability of slurry composition | | | B | B | A | B | A | Cannot be evaluated | D | E |

TABLE 1-continued

| | | | | | | | | |
|---|---|---|---|---|---|---|---|---|
| Initial efficiency of secondary battery | A | B | A | B | A | Cannot be evaluated | D | Cannot be evaluated |
| Resistance of secondary battery | B | B | B | A | B | Cannot be evaluated | C | Cannot be evaluated |

It can be seen from Table 1 that in Examples 1 to 13 in which a slurry composition was produced by a method of producing a slurry composition for a secondary battery positive electrode containing an organic solvent, a specific polymer having an extract pH within a specific range, and a positive electrode active material satisfying a specific chemical composition, it was possible to provide a slurry composition for a secondary battery positive electrode having excellent viscosity stability and sedimentation resistance. It can also be seen from Table 1 that it was not possible to provide a slurry composition for a secondary battery positive electrode excelling in terms of both viscosity stability and sedimentation resistance in Comparative Example 1 in which the pH of a polymer extract was lower than 3.5 and Comparative Examples 2 and 3 in which the pH of a polymer extract was 6.0 or higher.

INDUSTRIAL APPLICABILITY

According to the present disclosure, it is possible to provide a method of producing a slurry composition for a secondary battery positive electrode having excellent viscosity stability and sedimentation resistance.

Moreover, according to the present disclosure, it is possible to provide a method of producing a positive electrode for a secondary battery that can form a secondary battery having excellent battery characteristics.

Furthermore, according to the present disclosure, it is possible to provide a method of producing a secondary battery that has excellent battery characteristics.

The invention claimed is:

1. A method of producing a slurry composition for a secondary battery positive electrode containing an organic solvent, a positive electrode active material, and a polymer including a nitrile group-containing monomer unit and a linear alkylene structural unit having a carbon number of 4 or more, the method comprising
preparing the polymer by polymerizing a monomer composition containing at least a nitrile group-containing monomer and at least one of a conjugated diene monomer or a 1-olefin monomer, having a carbon number of 4 or more, in a solvent including deionized water to produce a polymer solution,
adding at least one of a pH modifier or a buffer solution into the polymer solution, followed by exchanging the solvent including the deionized water with the organic solvent, and
mixing the polymer accompanying the organic solvent with the positive electrode active material, wherein
the polymer satisfies a certain attribute of an extract obtained according to a method including:
preparing an 8 mass % N-methyl-2-pyrrolidone solution of the polymer;
diluting the 8 mass % N-methyl-2-pyrrolidone solution of the polymer by a factor of 10 with diluent of deionized water; and
stirring and pressing the polymer to extract liquid encapsulated in the polymer into the diluent so as to obtain an extract,
the certain attribute of the extract is a pH of not lower than 3.5 and lower than 6.0, and
the positive electrode active material has a chemical composition represented by formula (I), shown below, $$Li_\alpha Ni_a Co_b Mn_c M_d O_{2-(\beta/2)} X_\beta \quad (1)$$

where, in formula (I):
M is an element selected from the group consisting of Mg, Al, Cr, V, Ti, Cr, Fe, Zr, Zn, Si, Y, Nb, Ga, Sn, Mo, W, and combinations thereof;
X is a halogen element; and
$\alpha$, $\beta$, a, b, c, and d satisfy conditions (1) to (8), shown below:

$$0.90 \leq \alpha \leq 1.5 \quad (1)$$

$$0 \leq \beta \leq 0.1 \quad (2)$$

$$0.55 \leq a \leq 0.9 \quad (3)$$

$$0 \leq b \leq 0.45 \quad (4)$$

$$0 \leq c \leq 0.45 \quad (5)$$

$$0 \leq d \leq 0.1 \quad (6)$$

$$0.1 \leq b+c+d \leq 0.45 \quad (7)$$

$$a+b+c+d=1 \quad (8).$$

2. The method of producing a slurry composition for a secondary battery positive electrode according to claim 1, wherein the polymer has an iodine value of not less than 3 g/100 g and not more than 60 g/100 g.

3. The method of producing a slurry composition for a secondary battery positive electrode according to claim 1, wherein the polymer further includes an aromatic vinyl monomer unit.

4. The method of producing a slurry composition for a secondary battery positive electrode according to claim 1, wherein the polymer further includes a hydrophilic group-containing monomer unit.

5. A method of producing a positive electrode for a secondary battery comprising:
a slurry composition production step of producing a slurry composition for a secondary battery positive electrode by the method according to claim 1; and
a step of applying the slurry composition obtained in the slurry composition production step onto at least one side of a current collector and drying the slurry composition to form a positive electrode mixed material layer.

6. A method of producing a secondary battery including a positive electrode, a negative electrode, a separator, and an electrolyte solution, comprising a step of producing the positive electrode by the method according to claim 5.

* * * * *